(12) United States Patent
Tang et al.

(10) Patent No.: US 7,818,481 B2
(45) Date of Patent: Oct. 19, 2010

(54) COMPUTER SYSTEM AND MONITOR WITH PERIPHERAL INTERFACES

(75) Inventors: Jia-He Tang, Shenzhen (CN);
Wen-Haw Tseng, Taipei Hsien (TW);
Shih-Fang Wong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 180 days.

(21) Appl. No.: 12/172,255

(22) Filed: Jul. 13, 2008

(65) Prior Publication Data
US 2009/0031047 A1    Jan. 29, 2009

(30) Foreign Application Priority Data
Jul. 23, 2007    (CN) .................... 2007 1 0201157

(51) Int. Cl.
*G06F 13/12*    (2006.01)

(52) U.S. Cl. ................. 710/62; 710/2; 710/64

(58) Field of Classification Search ................ None
See application file for complete search history.

(56) References Cited

U.S. PATENT DOCUMENTS

| | | | |
|---|---|---|---|
| 6,633,934 B1* | 10/2003 | Thornton | 710/100 |
| 2005/0096086 A1* | 5/2005 | Singamsetty | 455/557 |
| 2006/0288139 A1* | 12/2006 | Lee et al. | 710/62 |

OTHER PUBLICATIONS

Eagle et al., Providing Upgradability to Computer Monitors, May 1, 1998, IBM Technical Disclosure Bulletin, pp. 1-2.*

* cited by examiner

*Primary Examiner*—Eron J Sorrell
(74) *Attorney, Agent, or Firm*—Frank R. Niranjan

(57) ABSTRACT

The present invention relates to a computer system and a monitor with peripheral interfaces. The computer system includes a monitor, a host, and a transmission cable. The monitor includes a plurality of peripheral interfaces and an integrated interface. The peripheral interfaces are utilized to connect corresponding peripheral devices, and the peripheral interfaces are connected with the integrated interface. The transmission cable is configured for connecting the integrated interface and the host, and transmitting peripheral signals from the peripheral devices to the host.

10 Claims, 4 Drawing Sheets

COMPUTER SYSTEM AND MONITOR WITH PERIPHERAL INTERFACES

BACKGROUND

1. Technical Field

The present invention relates to a computer system and a monitor, and more particularly, to a computer system and a monitor with peripheral interfaces.

2. Background

In a conventional computer system, peripheral interfaces, such as a mouse interface, a keyboard interface, and universal serial bus (USB) interfaces, are usually configured in a main frame of the computer system. The main frame is usually placed in a relatively secured area and peripheral devices are placed at a working area away from the main frame. When one needs to couple the peripheral devices to the main frame, one must spend considerable efforts to locate matching interfaces of the peripheral devices. Furthermore, USB peripheral devices are plug-and-play port and allow hot plugging, attachment of the USB peripheral devices to the main frame is frequent, and repeated efforts to locate and attach the USB peripheral devices to the USB interfaces are cumbersome.

There are some wireless peripheral devices, such as an infrared mouse, an infrared keyboard. The infrared mouse and the infrared keyboard transmit wireless signals to the main frame by infrared rays, while infrared signals are a point-to-point transmission. To achieve a reliable transmission, there should be no physical barriers between an infrared device and an infrared interface. The above-mentioned situation brings some trouble for the user.

Accordingly, what is needed in the art is a computer system that overcomes the aforementioned deficiencies.

SUMMARY

A computer system is provided. The computer system includes a monitor, a host, and a transmission cable. The monitor includes a plurality of peripheral interfaces and an integrated interface. The peripheral interfaces are configured to connect corresponding peripheral devices, and the peripheral interfaces are connected with the integrated interface. The transmission cable is configured for connecting the integrated interface and the host, and transmitting peripheral signals from the peripheral devices to the host.

Other advantages and novel features will be drawn from the following detailed description with reference to the attached drawings.

BRIEF DESCRIPTION OF THE DRAWINGS

The components in the drawings are not necessarily drawn to scale, the emphasis instead being placed upon clearly illustrating the principles of the computer system. Moreover, in the drawings, like reference numerals designate corresponding parts throughout the several views.

DETAILED DESCRIPTION OF THE EMBODIMENTS

Figure 1:
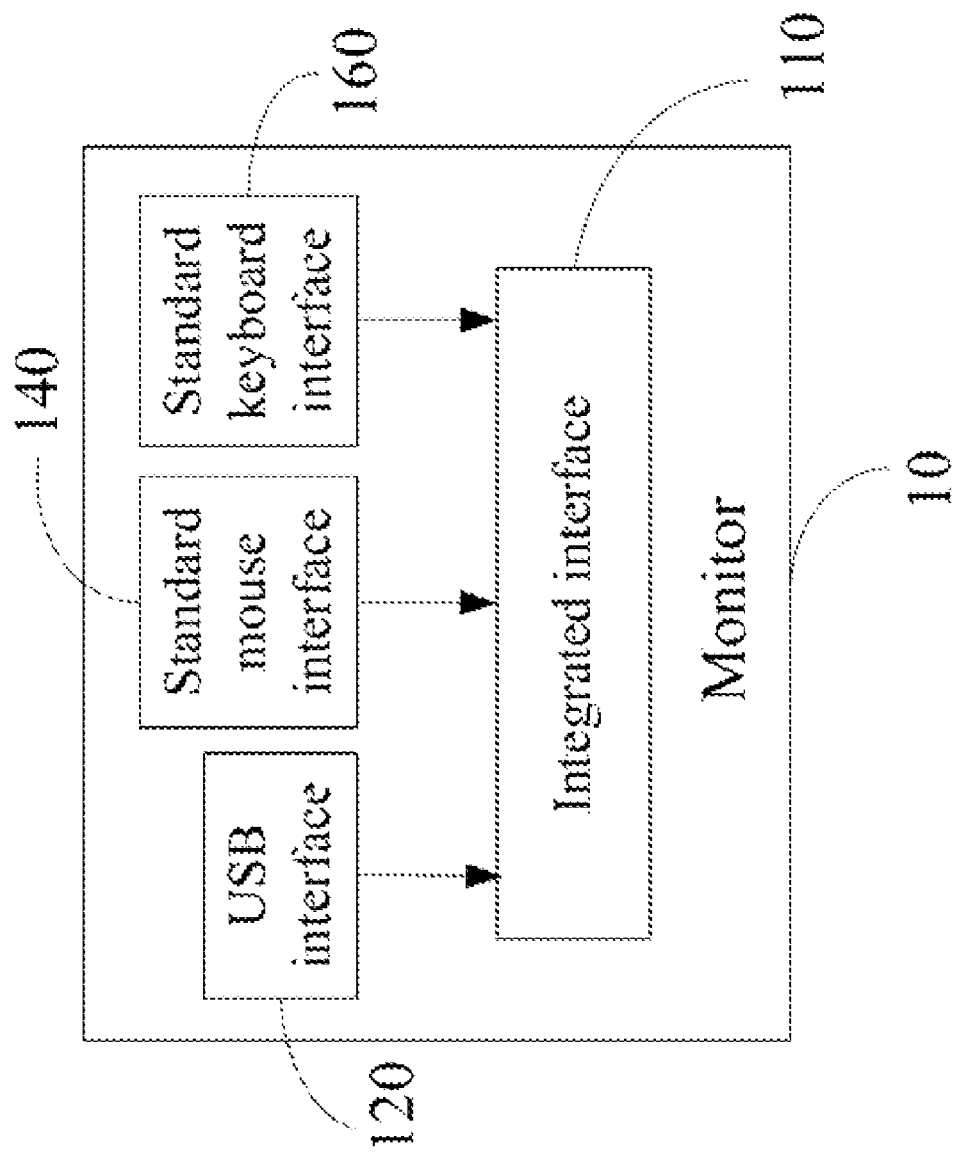
FIG. 1 is a block diagram of a hardware infrastructure of a monitor in accordance with an exemplary embodiment of the present invention.

FIG. 1 is a block diagram of a hardware infrastructure of a monitor in accordance with an exemplary embodiment of the present invention. The monitor 10 is equipped with an integrated interface 110 and a plurality of peripheral interfaces, such as a universal serial bus (USB) interface 120, a standard mouse interface 140, and a standard keyboard interface 160 on a panel thereof. The USB interface 120, the standard mouse interface 140, and the standard keyboard interface 160 are connected with the integrated interface 110. The integrated interface 110 is equipped with a particular number of pins for communicating with the peripheral interfaces. The particular number of the pins are dependent on numbers of pins of the peripheral interfaces. Typically, in the exemplary embodiment of FIG. 1, the number of the pins of the integrated interface 110 is equal to the total sum of the pins of the peripheral interfaces. Each of the peripheral interfaces is utilized to connect a peripheral device and thus to communicate with the peripheral device. The peripheral device may be a mouse, a keyboard, and a USB device. In addition, the number and types of the peripheral interfaces may be predetermined, as shown in FIG. 2 or FIG. 3.

Figure 2:
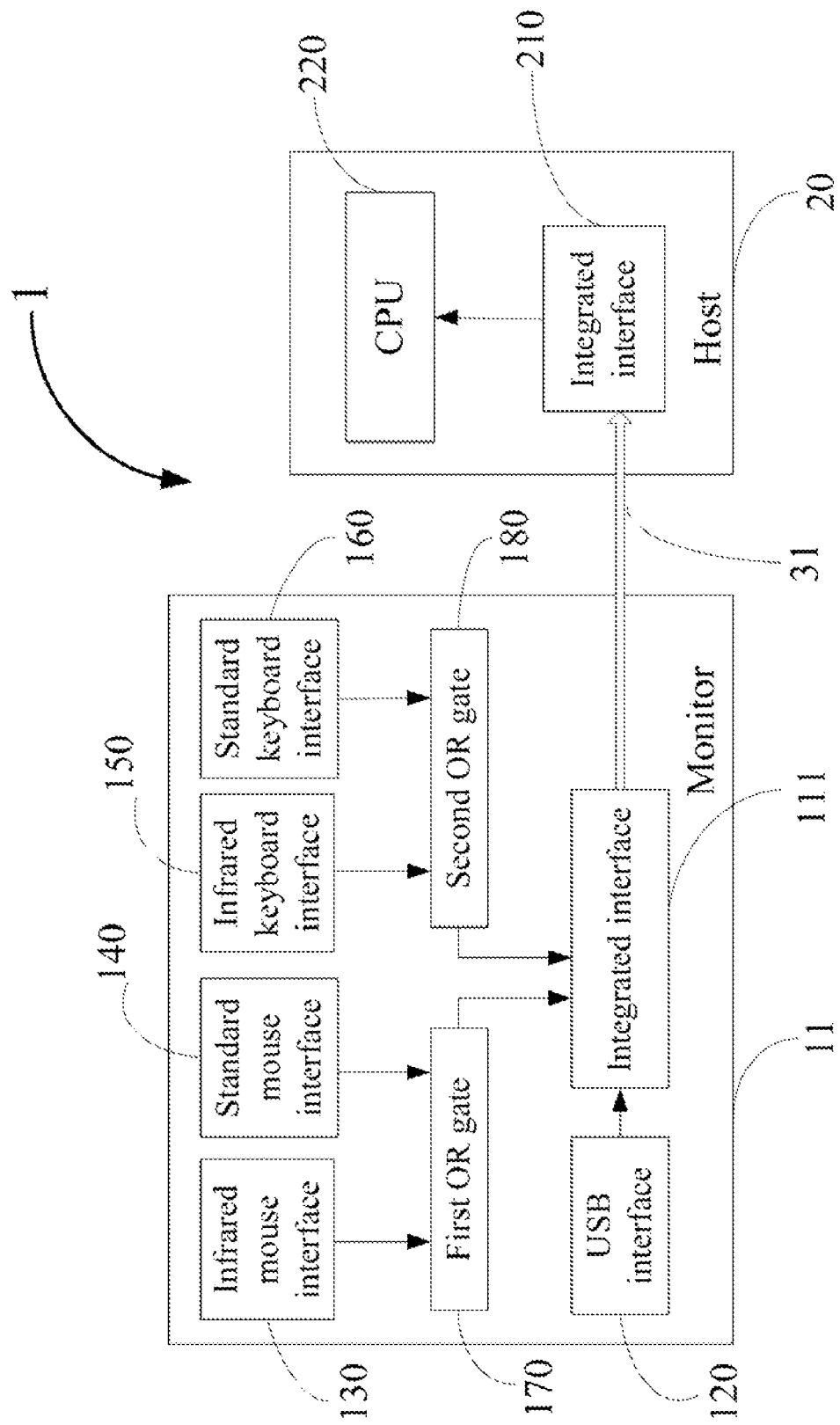
FIG. 2 is a block diagram of a hardware infrastructure of a computer system in accordance with another exemplary embodiment of the present invention.
Figure 3:
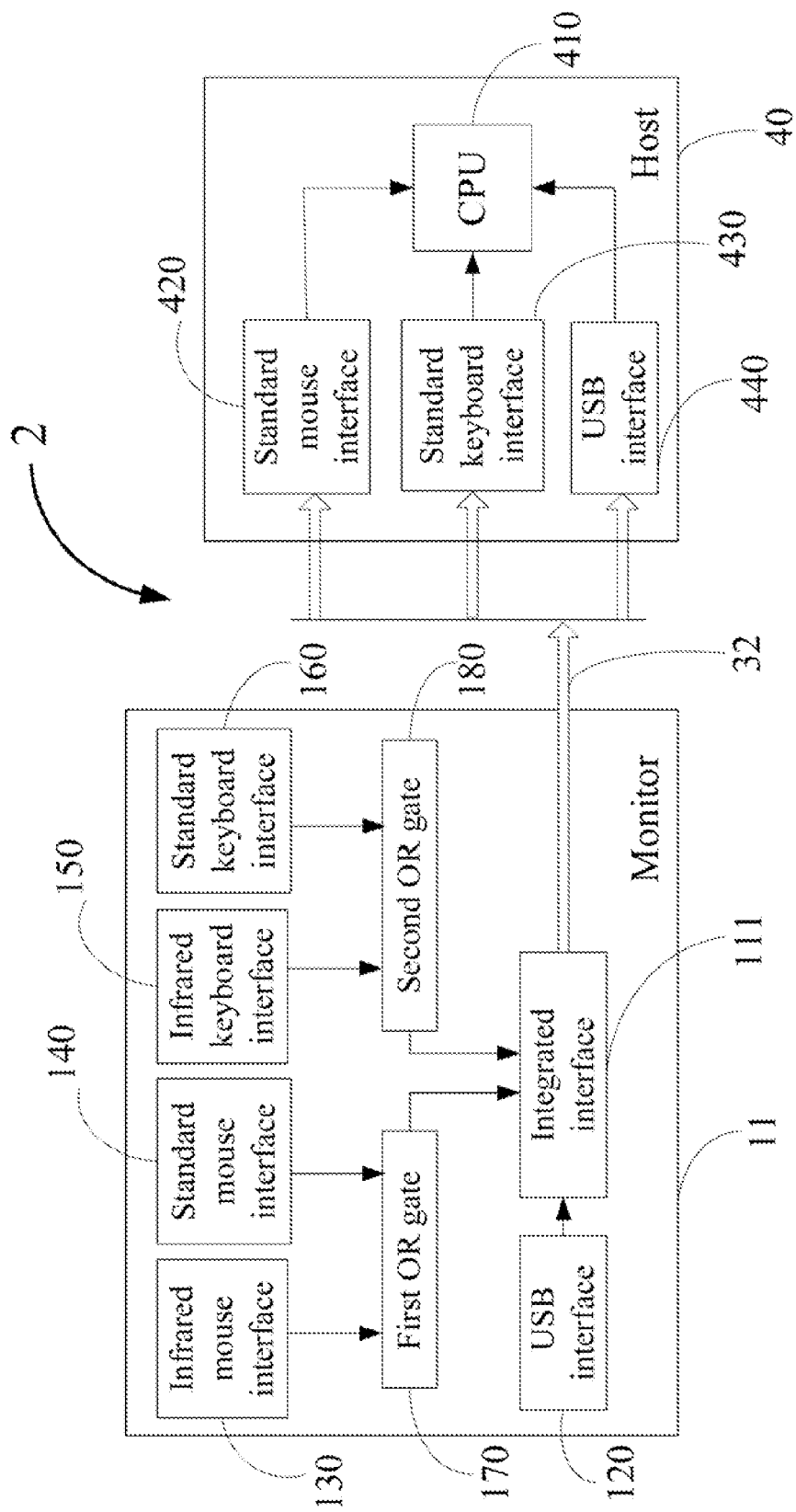
FIG. 3 is a block diagram of a hardware infrastructure of a computer system in accordance with another exemplary embodiment of the present invention.

FIG. 2 is a block diagram of a hardware infrastructure of a computer system in accordance with another exemplary embodiment of the present invention. The computer system 1 includes a monitor 11, a host 20, and a transmission cable 31. The monitor 11 is equipped with an integrated interface 111, the USB interface 120, an infrared mouse interface 130, the standard mouse interface 140, an infrared keyboard interface 150, and the standard keyboard interface 160 on a panel thereof. In order to decrease the number of pins of the integrated interface 111, the monitor 11 further includes a first OR gate 170 and a second OR gate 180. The first OR gate 170 is configured for connecting the infrared mouse interface 130 and the standard mouse interface 140. The second OR gate 180 is configured for connecting the infrared keyboard interface 150 and the standard keyboard interface 160. The first OR gate 130 and the second OR gate 140 are electrically connected with the integrated interface 111.

The host 20 includes an integrated interface 210 and a central processing unit (CPU) 220. The integrated interface 210 has a same configuration as that of the integrated interface 111. The transmission cable 31 is utilized to connect the integrated interface 111 and the integrated interface 210, and transmit peripheral signals from the peripheral devices to the host 20. Two ends of the transmission cable 31 are both a single port. The CPU 220, electrically coupled with the integrated interface 210, is configured for processing the peripheral signals and controlling a display, e.g., a video graphics adapter (VGA) (not shown), to transmit processed peripheral signals to display on the monitor 11.

The host 20 further includes a driver (not shown) of the integrated interface 210 to identify signals from the integrated interface 210.

FIG. 3 is a block diagram of a hardware infrastructure of a computer system in accordance with another exemplary embodiment of the present invention. The computer system 2 includes the monitor 11, a host 40, and a transmission cable 32.

The host 40 is a conventional host, namely where the host 40 includes a CPU 410 and a plurality of peripheral interfaces, such as a standard mouse interface 420, a standard keyboard interface 430, and a USB interface 440. The transmission cable 32 is utilized to connect the integrated interface 111 and the peripheral interfaces of the host 40, and transmits peripheral signals from the peripheral devices on the monitor 11 to the host 40. One end of the transmission cable 32 has a single port, and the other end has three ports. A first one of the three ports connects the standard mouse interface 420, a second one of the three ports connects the standard keyboard interface 430, and a third one of the three ports connects the USB interface 440.

The CPU 410, electrically connected with the peripheral interfaces (i.e., the standard mouse interface 420, the standard keyboard interface 430, and the USB interface 440), is configured for processing the peripheral signals from the peripheral interfaces on the monitor 11 and controlling the VGA to transmit processed peripheral signals to display on the monitor 11.

Figure 4:
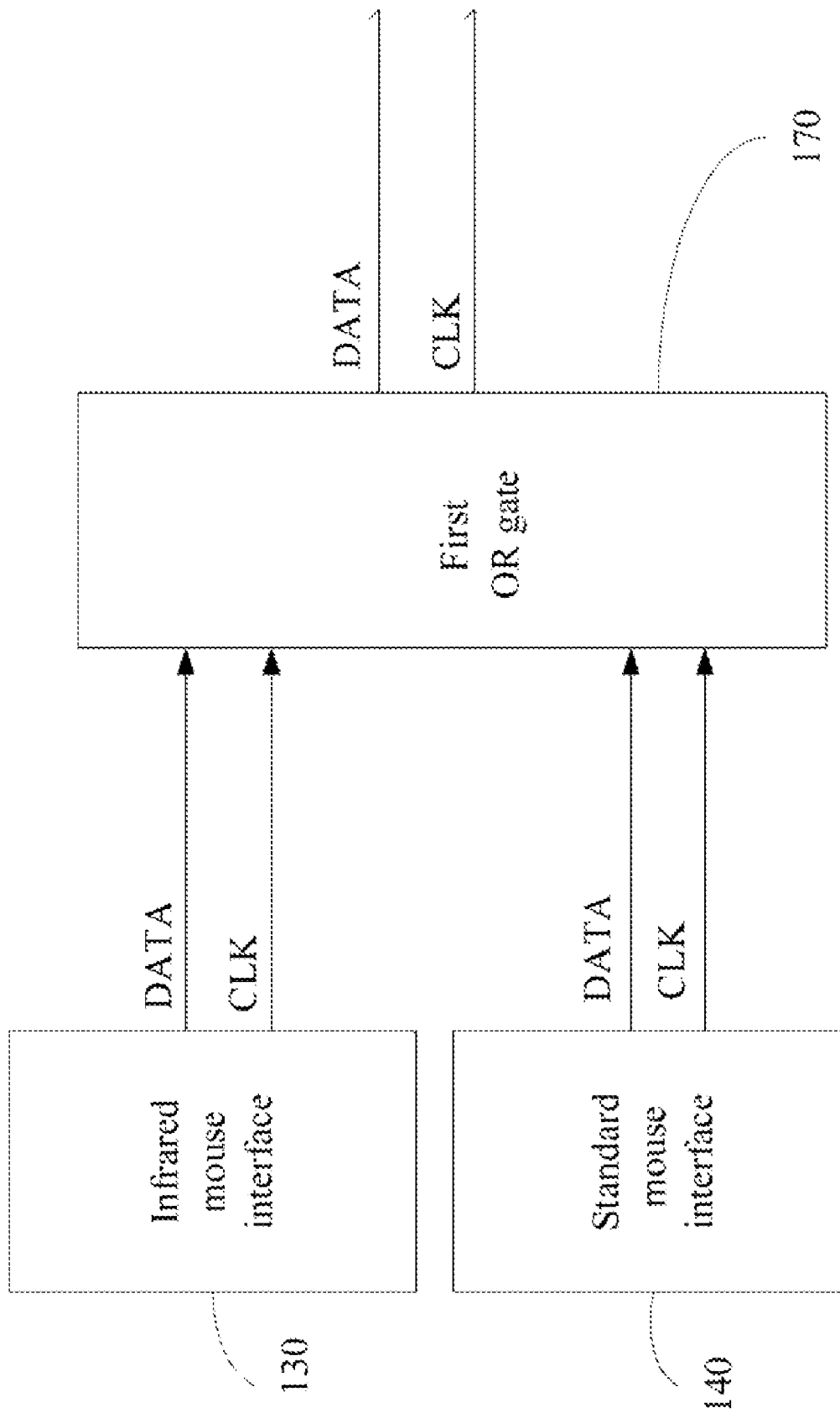
FIG. 4 is a logic circuit diagram of an infrared mouse interface and a standard mouse interface connected with a first OR gate, in accordance with another exemplary embodiment of the present invention.

FIG. 4 is a logic circuit diagram showing the infrared mouse interface 130 and the standard mouse interface 140 connected with the first OR gate 170, in accordance with another exemplary embodiment of the present invention. The first OR gate 170 receives data (DATA) signals and clock (CLK) signals from the infrared mouse interface 130 or the standard mouse interface 140. The first OR gate 170 switches its outputs on when either of its input is on. When one of the infrared mouse interface 130 and the standard mouse interface 140 is utilized, namely where one of the output of the infrared mouse interface 130 and the standard mouse interface 140 is true, the output of the first OR gate 170 is true, namely where the first OR gate 170 outputs data signals and clock signals from the infrared mouse interface 130 or the standard mouse interface 140.

Similarly, the second OR gate 180 coupling with the infrared keyboard interface 150 and the standard keyboard interface 160 has a same connecting relatives as that of FIG. 4, that is, the second OR gate 180 outputs data signals and clock signals from the infrared keyboard interface 150 or the standard keyboard interface 160.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer system comprising:
    a monitor comprising a plurality of peripheral interfaces and an integrated interface, wherein the peripheral interfaces are configured to connect corresponding peripheral devices and comprise an infrared mouse interface and a standard mouse interface, and the integrated interface is equipped with a particular number of pins for communicating with the peripheral interfaces;
    a host comprising an integrated interface same as the integrated interface of the monitor, the two integrated interface being connected by the transmission cable, wherein the host is a conventional host;
    a transmission cable for connecting the integrated interface and the host, and transmitting peripheral signals from the peripheral devices to the host, wherein one end of the transmission cable connecting to the host has at least one single port; and
    an OR gate, wherein the infrared mouse interface and the standard mouse interface are connected with the OR gate, and the OR gate is connected with the integrated interface.

2. The computer system as recited in claim 1, wherein the peripheral interfaces comprise an infrared keyboard interface and a standard keyboard interface.

3. The computer system as recited in claim 2, wherein the monitor further comprises an OR gate, the infrared keyboard interface and the standard keyboard interface are connected with the OR gate, and the OR gate is connected with the integrated interface.

4. The computer system as recited in claim 3, wherein the peripheral interfaces comprise at least one universal serial bus (USB) interface.

5. A monitor comprising:
    a plurality of peripheral interfaces configured for connecting corresponding peripheral devices and comprising an infrared mouse interface and a standard mouse interface;
    an integrated interface equipped with a particular number of pins for communicating with the peripheral interfaces; and
    an OR gate, wherein the infrared mouse interface and the standard mouse interface are connected with the OR gate, and the OR gate is connected with the integrated interface.

6. The monitor as recited in claim 5, wherein the peripheral interfaces comprise an infrared keyboard interface and a standard keyboard interface.

7. The monitor as recited in claim 6, further comprising an OR gate, wherein the infrared keyboard interface and the standard keyboard interface are connected with the OR gate, and the OR gate is connected with the integrated interface.

8. The monitor as recited in claim 7, wherein the peripheral interfaces comprise at least one USB interface.

9. The monitor as recited in claim 8, wherein the peripheral interfaces comprise an infrared mouse interface.

10. The monitor as recited in claim 9, wherein the peripheral interfaces comprise an infrared keyboard interface.

* * * * *